Nov. 14, 1961  E. LISOTA  3,008,730
TRAILER TONGUE DOLLY UNIT
Filed June 6, 1960 2 Sheets-Sheet 1
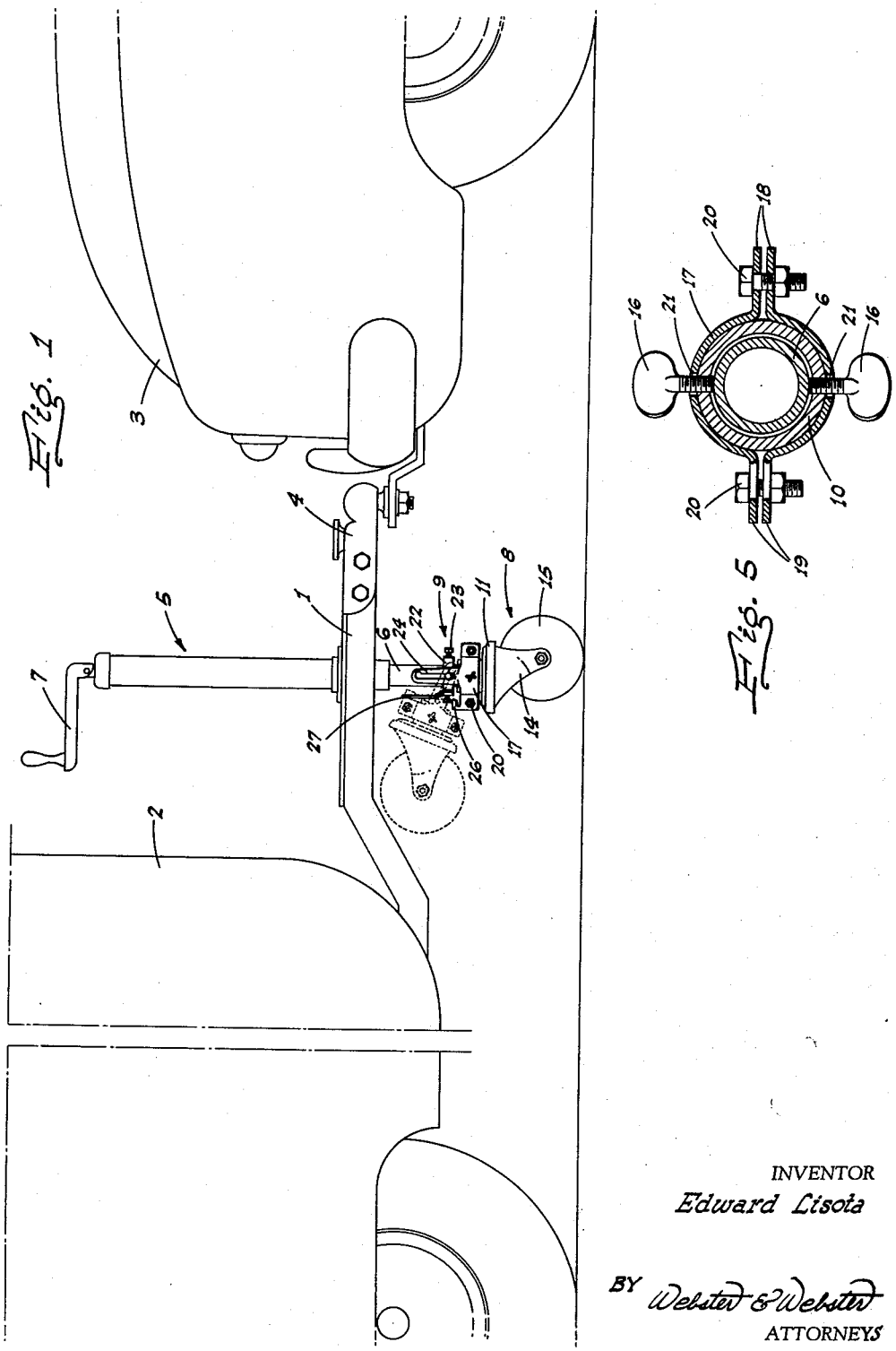
INVENTOR
*Edward Lisota*
BY *Webster & Webster*
ATTORNEYS Nov. 14, 1961         E. LISOTA         3,008,730
TRAILER TONGUE DOLLY UNIT
Filed June 6, 1960                      2 Sheets-Sheet 2
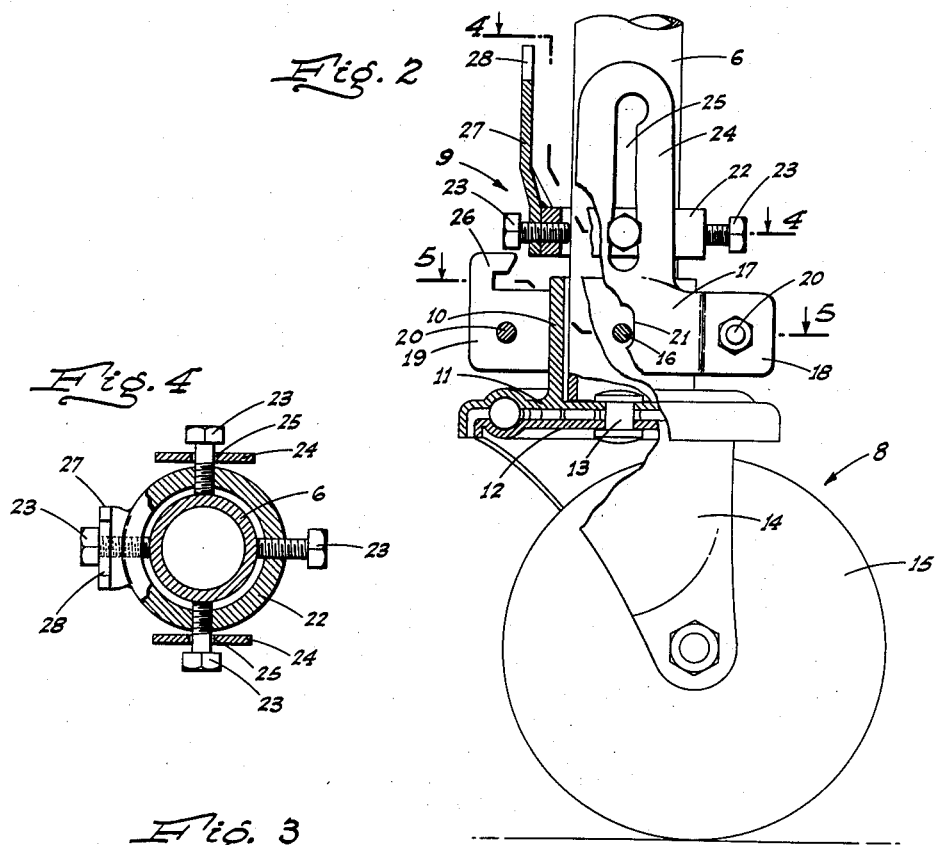
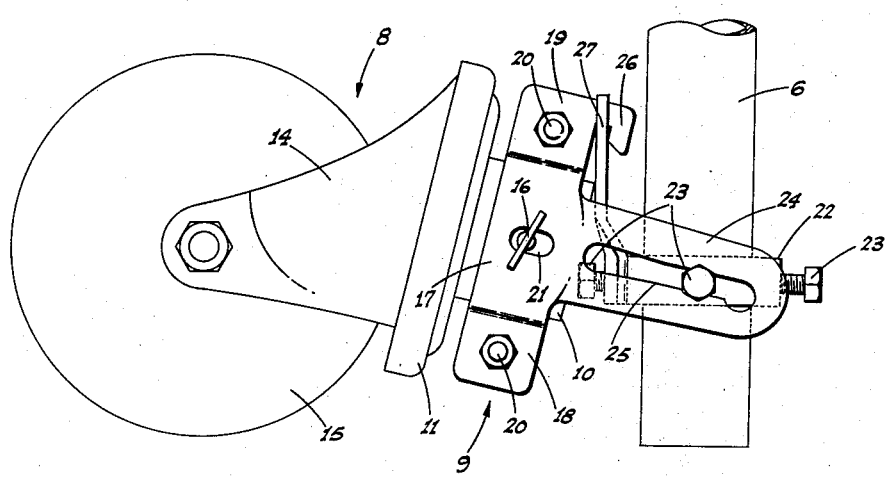

United States Patent Office 3,008,730
Patented Nov. 14, 1961

3,008,730
TRAILER TONGUE DOLLY UNIT
Edward Lisota, Patterson, Calif., assignor to Lisota Manufacturing Co., Inc., Modesto, Calif., a corporation of California
Filed June 6, 1960, Ser. No. 34,309
5 Claims. (Cl. 280—150.5)

This invention relates in general to a trailer tongue dolly unit, and in particular is directed to a novel mounting device for securing the dolly unit on the depending post of a jack carried by such tongue.

The major object of the present invention is to provide a dolly unit mounting device, as above, which is arranged so that such dolly unit may be disposed, selectively, in a lowered ground engaging position directly below the jack post to support the trailer tongue when uncoupled from the towing vehicle, or in a raised transport position extending rearwardly from said post so as to be out of the way, and well clear of the ground when the trailer is coupled to, and being towed by, such vehicle.

Another important object of the invention is to contruct the dolly unit mounting device, as in the preceding paragraph, in a manner whereby the selective positioning of such dolly unit can be easily, conveniently, and quickly accomplished by hand; said unit, in either of its positions, being maintained in stable connection with the post.

A further object of the invention is to provide a trailer tongue dolly unit which is simple in structure and designed for ease and economy of manufacture, yet practical, reliable, and durable.

These objects are accomplished by means of such structure and relative arrangement of parts as will fully appear by a perusal of the following specification and claims.

In the drawings:

FIG. 1 is a side elevation showing the mounting device connecting a dolly unit to the lower end of the jack post; the dolly unit being shown in lowered ground engaging position in full lines, and in raised transport position in dotted lines.

FIG. 2 is an enlarged side elevation, partly broken away and partly in section, of the mounting device, the adjacent portion of the jack post, and the dolly unit; the latter being in its lowered ground engaging position, as in FIG. 1.

FIG. 3 is a similar side elevation, but shows the dolly unit in raised transport position.

FIG. 4 is a sectional plan taken on line 4—4 of FIG. 2.

FIG. 5 is a sectional plan taken on line 5—5 of FIG. 2.

Referring now more particularly to the drawings, and to the characters of reference marked thereon, the numeral 1 indicates the tongue of a trailer 2, and which tongue is adapted to be detachably coupled, in draft relation, to the rear of a motor vehicle 3 by means of a hitch 4.

Intermediate its ends the tongue 1 carries a vertical jack 5, which includes a depending but vertically adjustable, cylindrical jack post 6; such post 6 being adjusted up or down by means of a hand crank 7 on the upper end of said jack 5.

The dolly unit, indicated generally at 8, is secured in connection with the depending jack post 6 by means of the novel mounting device which embraces the present invention, and which device is indicated generally at 9.

By reference to the positions of the parts when the dolly unit 8 is in its lowered ground engaging position, said mounting device 9 comprises an upwardly opening socket 10 disposed centrally and rigid with the top disc 11 of the dolly unit 8; such unit including, with said top disc, a relatively rotatable bottom disc 12, a central pivot 13, and a yoke 14 which depends from the bottom disc 12 and carries the dolly wheel 15.

The lower end portion of the depending jack post 6 seats in the socket 10, being releasably maintained therein by thumb screws 16 threaded through said socket from opposite sides thereof.

A split clamp-type collar 17 tightly surrounds the upstanding socket 10, and such collar 17 includes a forwardly projecting pair of ears 18 and a rearwardly projecting pair of ears 19; each such pair of ears being connected by a cross bolt 20.

On each side the collar 17 is formed with a slot 21 which permits of passage of the adjacent thumb screws 16.

Another and full-circle collar 22 surrounds the depending jack post 6 adjacent but above the upper end of the socket 10; such collar 22 being rigidly attached to said jack post by four set screws 23 disposed 90 degrees apart; opposed ones of said set screws projecting radially outwardly from the sides of said collar.

The collar 17 is formed on each side with an upwardly projecting attachment arm 24 which extends to a free end termination a considerable distance above the collar 22. Each such attachment arm 24—which lies relatively close to the collar 22—is longitudinally slotted, as at 25, and the related set screw 23 extends through the slot with the set screw head outwardly of and wider than said slot. In the lowered ground engaging position of the dolly unit 8 the set screws 23 occupy a position intermediate the ends of said slots.

The rearwardly projecting pair of ears 19 on the collar 17 are formed with upstanding, radially inwardly opening hooks 26, while the collar 22 is provided at the back with an upstanding, rigid, hook receiving bar 27. The bar 27 is spaced rearwardly from the jack post 6 and at its upper end said bar is formed with a U-shaped hook receiving notch 28.

When it is desired to shift the dolly unit 8 from its lowered ground engaging position, as in full lines in FIG. 1, to its raised transport position, as in dotted lines in such figure, the trailer tongue 1 is first coupled to the motor vehicle 3 by the hitch 4. Thereafter, the jack post 6 is raised to an extent greater than the depth of the socket 10; this being followed by unloosening of the thumb screws 16.

Upon unloosening the thumb screws 16 the dolly unit 8 drops downward until the lower end portion of jack post 6 escapes said socket 10, and at which time the attachment arms 24 likewise lower, with the related set screws 23 moved relatively upwardly in the slots 25.

Nextly, the dolly unit 8 is grasped and swung upwardly and rearwardly to a position which permits the hooks 26 to be engaged over the upper end of the hook receiving bar 27 and in the notch 28.

With the hooks 26 so engaged with the bar 27 the dolly unit 8 is effectively supported in its raised transport position. Downward swinging of the dolly unit 8 from such position and about the hooks 26, with the upper end of the bar 27 as a pivot point, is prevented because the slots 25 are neither concentric with the arc centered at the hook 26 and passing through the pivot elements 23, nor are such slots tangent to such arc, and said pivot elements therefore bind against the then lower edges of said slots.

To return the dolly unit 8 from its raised, transport position to its lowered position, the procedure hereinbefore described is merely reversed, starting with disengagement of the hooks 26 from the bar 27 and completing with engagement of the lower end portion of the jack post 6 in socket 10 and tightening of the thumb screws 16.

After the dolly unit 8 is so returned to its lowered position the jack post 6 is adjusted downwardly sufficient to place said dolly unit in ground engagement.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A mounting device for connecting a dolly unit to a depending post on a trailer tongue and for movement between a lowered ground engaging position and a raised transport position, the dolly unit having an upstanding socket in which the lower end of the post is removably seated when the dolly unit is in said lowered position, said mounting device comprising attachment arms rigid with opposite sides of the socket and extending upwardly along corresponding sides of the post when the latter is seated in said socket, the attachment arms having longitudinal slots therein, opposed pivot elements rigid with the post and projecting through corresponding slots, said pivot elements occupying a position in the slots which permits of disengagement of the socket from the post upon upward movement of the latter, the dolly unit then being swingable upwardly to raised position, and with the arms turning about said pivot elements, releasable means between the post and dolly unit adapted to suspend the latter in said raised position, a collar secured on the socket, the attachment arms being on said collar, and another collar secured on the post above the portion thereof which seats in the socket, the pivot elements being on said other collar; said last named releasable means being a hook and a hook receiver, each being fixed on a corresponding one of the collars.

2. A mounting device for connecting a dolly unit to a depending post on a trailer tongue and for movement between a lowered ground engaging position and a raised transport position, the dolly unit having an upstanding socket in which the lower end of the post is removably seated when the dolly unit is in said lowered position, said mounting device comprising one collar initially separate from and secured on the socket, another collar initially separate from and secured on the post above the portion which seats in the socket, attachment arms rigid with opposite sides of said one collar and extending upwardly past corresponding sides of the other collar when the post is seated in the socket, the attachment arms having longitudinal slots therein, and opposed pivot elements rigid with said other collar and projecting through corresponding slots, said pivot elements occupying a position in the slots which permits of disengagement of the socket from the post, the dolly unit then being swingable upwardly to raised position and with the arms turning about said pivot elements; there being releasable means on the collars cooperating to hold the dolly unit suspended in said raised position.

3. A mounting device for connecting a dolly unit to a depending post on a forwardly projecting trailer tongue and for swinging movement between a lowered ground engaging position directly below the post and a raised transport position extending rearwardly therefrom; said mounting device comprising an upstanding socket on the dolly unit, the lower end of the post seating in the socket when the dolly unit is in lowered position, releasable means securing the post in the socket, one collar secured on the socket, another collar secured on the post above the portion which seats in the socket, attachment arms rigid with opposite sides of said one collar and extending upwardly past corresponding sides of the other collar when the post is seated in the socket, the attachment arms having longitudinal slots therein, opposed pivot elements rigid with said other collar and projecting through corresponding slots, said pivot elements occupying a position in the slots which permits disengagement of the socket from the post, the dolly unit then being swingable rearwardly and upwardly to raised position and with the arms turning about said pivot elements, an exposed hook secured to said one collar at the rear thereof, and an exposed hook receiver secured to said other collar at the rear thereof; the hook being adapted to engage the receiver to releasably suspend the dolly unit in said raised position.

4. A mounting device, as in claim 3, in which said one collar includes rearwardly projecting clamping ears and with at least one of which the hook is formed.

5. A mounting device, as in claim 3, in which the hook receiver is a bar fixed on and upstanding from said other collar in clearance relation to the post; such bar having a hook receiving notch in the upper end thereof.

References Cited in the file of this patent

UNITED STATES PATENTS

| | | |
|---|---|---|
| 763,214 | Smith | June 21, 1904 |
| 813,438 | Landis | Feb. 27, 1906 |
| 2,090,776 | Arndt | Aug. 24, 1937 |
| 2,162,181 | Skinner | June 13, 1939 |
| 2,167,520 | Claude-Mantle | July 25, 1939 |
| 2,446,321 | Bartholomew | Aug. 3, 1948 |
| 2,634,941 | Eckert | Apr. 14, 1953 |
| 2,810,588 | Rozett | Oct. 22, 1957 |
| 2,965,392 | Mitchell et al. | Dec. 20, 1960 |

FOREIGN PATENTS

| | | |
|---|---|---|
| 547,202 | Canada | Oct. 8, 1957 |
| 497,338 | Great Britain | Dec. 15, 1938 |